J. & W. MILLER.
MEASURING TOOL AND DRILL JIG.
APPLICATION FILED NOV. 20, 1915.
1,191,906.
Patented July 18, 1916.
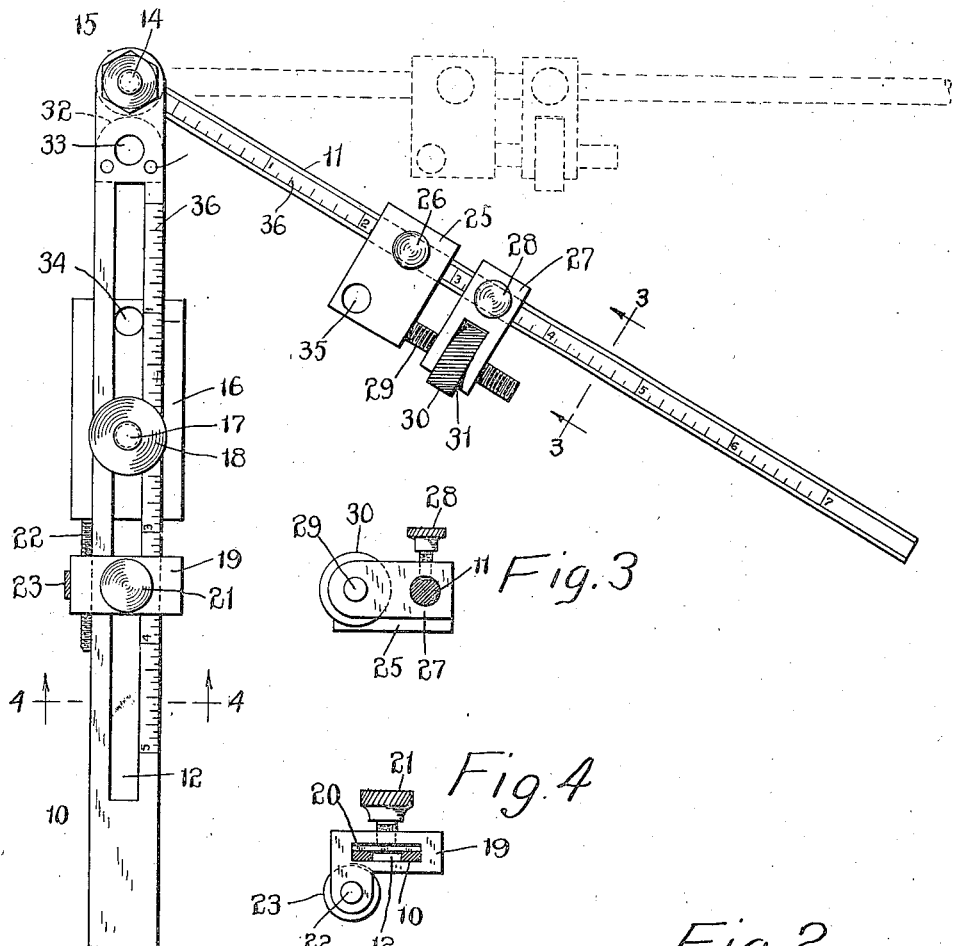
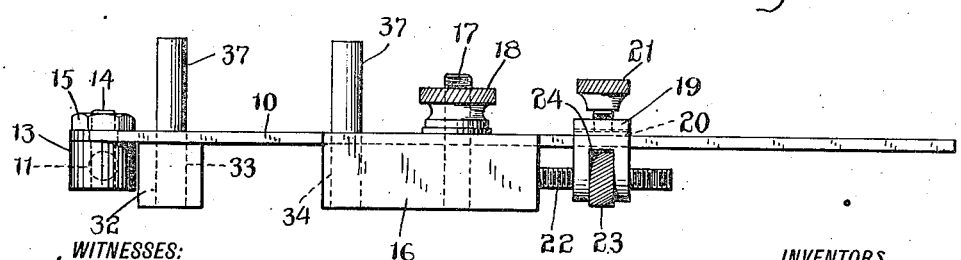
WITNESSES:
H. W. Meade
INVENTORS
James Miller and
William Miller
BY
A. M. Wooster
ATTORNEY

UNITED STATES PATENT OFFICE.

JAMES MILLER, OF STRATFORD, AND WILLIAM MILLER, OF BRIDGEPORT, CONNECTICUT.

MEASURING-TOOL AND DRILL-JIG.

1,191,906.  Specification of Letters Patent.  Patented July 18, 1916.

Application filed November 29, 1915. Serial No. 63,944.

*To all whom it may concern:*

Be it known that we, (1) JAMES MILLER and (2) WILLIAM MILLER, subjects of the King of Great Britain, residing at (1) Stratford and (2) Bridgeport, county of Fairfield, State of Connecticut, have invented an Improvement in Measuring-Tools and Drill-Jigs, of which the following is a specification.

This invention has for its object to provide a jig adapted for use by tool makers and other high grade artisans, in jig making and in any special work where it is required to lay out and drill holes in work in exact position with relation to each other.

With these and other objects in view we have devised the novel tool which we will now describe, referring to the accompanying drawing forming a part of this specification and using reference characters to indicate the several parts.

Figure 1 is a plan view of our novel jig, as in use; Fig. 2 an elevation from the left in Fig. 1; Fig. 3 a section on the line 3—3 in Fig. 1, looking in the direction of the arrows, and Fig. 4 is a section on the line 4—4 in Fig. 1, looking in the direction of the arrows.

10 and 11 denote movable arms which are pivoted together. In the present instance we have shown arm 10 as consisting of a bar having a longitudinal slot 12, and arm 11 as a round rod slightly flatted on its upper side, and the hinge as consisting of a block 13 drilled to receive arm 11 and hold it rigidly, and provided with a threaded stud 14 which passes through a hole in arm 10 and is engaged by a nut 15.

16 denotes a slide recessed in its upper side to receive arm 10, and provided with a threaded stud 17, passing through the slot, and engaged by a thumb nut 18 to lock the slide to the arm. Contiguous to slide 16 is a block 19 slotted to receive arm 10 upon which it may slide. A clamping plate 20 lying in the slot above the arm is engaged by a set screw 21 to lock the block in place on the arm.

22 denotes a screw rigidly secured in the slide and passing through a hole in the block. A nut 23 lying in a slot 24 in the block engages the screw and acts, when rotated, to move the slide longitudinally on the arm.

25 denotes a slide on arm 11. In this case, the slide is provided with a hole to receive the arm, and a set screw 26 in the slide engages the arm to lock the slide in place. Contiguous to slide 25 is a block 27 having a hole to receive the arm upon which it may slide. A set screw 28 in the block engages the arm to lock the block in place.

29 denotes a screw rigidly secured in the slide and passing through a hole in the block. A nut 30 lying in a slot 31 in the block engages the screw and acts when rotated to move the slide longitudinally on the arm. Upon the under side of arm 10 contiguous to block 13 is a block 32 rigidly secured in place.

33 denotes a hole in arm 10 and block 32, 34 a hole in slide 16, and 35 a hole in slide 25. These holes are of exactly uniform diameter, and each is adapted to receive an accurately fitting pin 37, for measuring purposes, see Fig. 2, or to guide a drill. Scales 36 are provided on the arms for convenience in setting the slides approximately, exact adjustment being effected by means of screws 22 and 29, as will presently be explained.

The operation in laying out a series of holes is as follows: The operator first adjusts hole 34 with relation to hole 33. To effect this, pins are placed in the holes and the operator loosens thumb nut 18 and set screw 21 and places slide 16 in approximate adjustment, using the scale on the arm. Set screw 21 is then tightened up to lock block 19 to the arm. The operator obtains his fine adjustment by means of a measuring instrument, as a micrometer, engaging the pins, allowance being made, in reading the instrument, for one diameter, as the spacing apart of the holes is measured from center to center. Nut 23 on screw 22 is then manipulated to make the necessary movement of slide 16 to complete the adjustment, as determined by the micrometer. Having effected the adjustment, the slide is locked by tightening up the thumb nut. Two holes are now located, and the tool may be clamped in place in any ordinary or preferred manner. If a third is required, the operation is as follows: If the hole is required to be placed on a line intersecting the center of hole 33 and at right angles to a line intersecting the centers of holes 33 and 34, then the arms are placed at right angles to each other, a pin is placed in hole 35, and the required distance of hole 35 from hole 33 is determined in the same manner as before. Slide 25 is first placed at an approximate adjustment and then the fine adjustment is effected by manipulation of nut 30 on screw 29 in connection with the use of a micrometer, after which the tool is clamped in place.

Suppose now that a third hole is required at any distance, within the scope of the instrument, from either hole 33 or hole 34, but not on a line intersecting the center of either hole and at right angles to a line intersecting the centers of said holes. Then the operator proceeds as follows: Arm 11 is swung to approximately the position required, a pin is placed in hole 35, and slide 25 is adjusted approximately on the arm, as before. The required distance of the center of hole 35 from the centers of holes 33 and 34 is of course known. Measurements are made with a suitable measuring instrument, as a micrometer, between the pins in holes 33 and 34 and the pin in hole 35. Arm 11 and slide 25 are then adjusted, as may be required, to place the centers of the three pins in the exact relation with reference to each other that has been determined by a measuring instrument. The tool is then clamped in place, after which the pins may be removed and the three holes laid out may be drilled in the work. If additional holes are required, they may be laid out in the manner described, using either of the holes already drilled as a center from which to locate new holes.

This invention effects a great saving in the time of high priced men, as it dispenses entirely with the slow and therefore expensive use of buttons, so called, in the location of holes.

Having thus described our invention, we claim:

1. A measuring tool and drill jig comprising two arms pivoted together, one of said arms being provided near the pivotal point with a guide hole, slides upon said arms both provided with guide holes, means for adjusting the slides on the arms and means for locking the slides after adjustment whereby holes may be laid out and drilled at any distance apart and at any position relative to each other.

2. A tool of the character described comprising arms pivoted together, one of which is provided with a guide hole, slides upon the arms each provided with a guide hole, slotted blocks contiguous to the slides, screws fixed in the slides and passing through the blocks, nuts upon the screws and lying in the slots for adjusting the slides, and means for independently locking the slides and the blocks to the arms.

3. A tool of the character described comprising a slotted arm provided with a guide hole, a hinge comprising a block having a threaded stud passing loosely through said arm and provided with a nut, a second arm consisting of a rod flatted on its upper side and secured to the block, slides on said arms, each provided with a guide hole, means for adjusting said slides on the arms and means for locking the slides after adjustment.

In testimony whereof we affix our signatures.

JAMES MILLER.
WILLIAM MILLER.